United States Patent
Hahm et al.

(10) Patent No.: US 8,862,714 B2
(45) Date of Patent: Oct. 14, 2014

(54) APPARATUS AND METHOD FOR VIRTUALIZING OF NETWORK DEVICE

(75) Inventors: Jin Ho Hahm, Daejeon (KR); Sung Min Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 316 days.

(21) Appl. No.: 13/048,654

(22) Filed: Mar. 15, 2011

(65) Prior Publication Data

US 2011/0225282 A1    Sep. 15, 2011

(30) Foreign Application Priority Data

Mar. 15, 2010  (KR) .................. 10-2010-0022813
Mar. 15, 2011  (KR) .................. 10-2011-0022732

(51) Int. Cl.
*G06F 15/173*  (2006.01)
*H04L 12/46*  (2006.01)

(52) U.S. Cl.
CPC .................. *H04L 12/4641* (2013.01)
USPC .......................................... 709/223

(58) Field of Classification Search
USPC ................................... 709/223, 230
See application file for complete search history.

(56) References Cited

U.S. PATENT DOCUMENTS

| | | | |
|---|---|---|---|
| 7,373,646 B1* | 5/2008 | Smith | 718/108 |
| 2004/0215799 A1* | 10/2004 | Lehmann et al. | 709/230 |
| 2008/0010296 A1* | 1/2008 | Bayliss et al. | 707/10 |
| 2008/0015914 A1* | 1/2008 | Jacobs et al. | 705/7 |
| 2009/0204959 A1* | 8/2009 | Anand et al. | 718/1 |
| 2011/0004876 A1 | 1/2011 | Wu et al. | |
| 2011/0004877 A1 | 1/2011 | Wu | |
| 2011/0022694 A1 | 1/2011 | Dalal et al. | |
| 2011/0035494 A1 | 2/2011 | Pandey et al. | |
| 2011/0047542 A1* | 2/2011 | Dang et al. | 718/1 |
| 2011/0075664 A1* | 3/2011 | Lambeth et al. | 370/390 |
| 2011/0176552 A1* | 7/2011 | Rajagopalan | 370/401 |
| 2012/0320068 A1* | 12/2012 | Rose | 345/502 |

* cited by examiner

*Primary Examiner* — Jason Recek (57) ABSTRACT

An apparatus for virtualizing network equipment provides at least one virtualized network equipment by virtualizing the network equipment, schedules the pieces of virtualized network equipment, and executes a relevant program. Here, the virtualization apparatus performs context switching according to the scheduling in the time unit of context switching and switches to another program.

8 Claims, 8 Drawing Sheets

APPARATUS AND METHOD FOR VIRTUALIZING OF NETWORK DEVICE

BACKGROUND OF THE INVENTION (a) Field of the Invention

The present invention relates to a method and apparatus for virtualizing network equipment. More particularly, the present invention relates to a method of supporting network virtualization by virtualizing network equipment for performing high-speed packet processing.

(b) Description of the Related Art

Network virtualization is technology supporting several virtual networks by virtualizing each of elements constituting a network. For network virtualization, network equipment which is an element constituting a network needs to be virtualized.

The virtualization of network equipment is technology supporting several virtual routers by virtualizing an apparatus for processing packets, such as a router, at high speed. A set of virtual routers interconnected may form a virtual network.

A method of virtualizing network equipment may be chiefly divided into hardware-based virtualization technology and software-based router virtualization technology.

An OpenFlow switch-based router is a representative hardware-based virtual router. The OpenFlow switch-based router includes an OpenFlow switch for forwarding packets based on a flow table and a controller for controlling the flow table. The flow table may be changed by the controller, and the traffic of a virtual network is physically separated along a route determined by the flow table, thereby enabling the operation of the virtual network.

The hardware-based virtual router, such as OpenFlow, has an advantage in that there is almost no deterioration of performance as compared with the existing router because it can rapidly process traffic with the help of forwarding-dedicated hardware. However, the hardware-based virtual router has low flexibility because all the functions must be implemented in hardware. Accordingly, from a viewpoint of the functions of the virtual router, a problem arises because it is difficult to support a new network structure required in a future Internet or different protocols for networks, add a new packet header, apply various network policies, and handle various user demands.

On the other hand, the software-based virtual router provides the virtualization of router software through virtualization software in an upper layer of hardware. The virtualization software is software capable of creating and managing a plurality of virtual machines which can be operated as respective independent machines. The software-based virtual router is advantageous in that several functional requirements which were difficult to support in a hardware-based virtual router can be easily supported through programming, but has limited packet processing performance owing to the overhead of virtualization software and virtual machines. Furthermore, currently supported virtualization software has limits to the dynamic allocation of physical resources to each virtual network and to control of the physical resources because it insufficiently supports a monitoring function for the physical resources and the dynamic control and allocation of the physical resources.

Meanwhile, there is an apparatus of a form in which the advantages of the hardware-based router and the soft-based router, such as an NP (Network Processor), such as Octeon, are properly mixed.

The NP, such as Octeon, can drive a program at high speed by operating a router program on a CPU without an O/S and also process a large amount of packets at high speed by supporting parallel processing using a plurality of cores. Furthermore, Octeon II provides technology capable of virtualizing the Octeon NP through an EM visor.

If the EM visor is used, however, a program desired by a user can be dynamically loaded and executed in a plurality of cores, but it is not easy to operate the user program in a different kind of an NP because the user program does not support independence between platforms in a binary level. Furthermore, there is a disadvantage in that error or an abnormal operation of one program may affect other programs because the programs cannot be fully separated from each other.

SUMMARY OF THE INVENTION

The present invention has been made in an effort to provide a method and apparatus for virtualizing network equipment, having advantages of being able to support high-speed packet processing in a virtualized state, guarantee isolation between different user programs, and support independence between platforms for the user programs.

A virtualization apparatus according to an embodiment of the present invention includes network equipment and a network virtualization management module. The network virtualization management module provides at least one virtualized network equipment by virtualizing the network equipment, encapsulates a packet when non-virtualized network equipment is placed between the virtualized network equipment and a destination of the packet, and sends the encapsulated packet.

According to another embodiment of the present invention, there is provided a method of virtualizing network equipment in a virtualization apparatus. The virtualization method includes the steps of providing at least one virtualized network equipment by virtualizing the network equipment, scheduling the at least one virtualized network equipment, executing a program of the at least one virtualized network equipment according to the scheduling, and performing context switching in a predetermined time unit.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification and claims, unless explicitly described to the contrary, the word "comprise" and variations such as "comprises" or "comprising", will be understood to imply the inclusion of stated elements but not the exclusion of any other elements.

A method and apparatus for virtualizing network equipment according to embodiments of the present invention are described with reference to the drawings.

Figure 1:
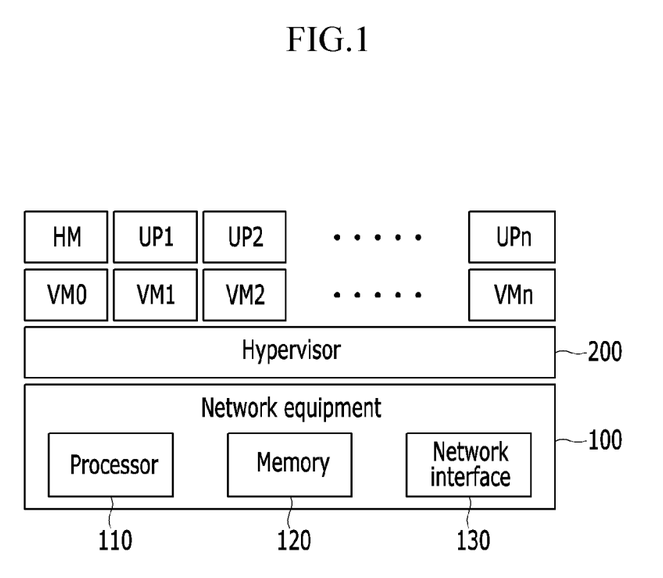
FIG. 1 is a diagram schematically showing the virtualization structure of network equipment according to an embodiment of the present invention.

FIG. 1 is a diagram schematically showing the virtualization structure of network equipment according to an embodiment of the present invention.

Referring to FIG. 1, an apparatus for virtualizing network equipment includes network equipment 100 and a hypervisor 200 (that is, a network virtualization management module).

The hypervisor 200 can create and manage a plurality of virtual machines VM0-VMn by virtualizing the network equipment 100 in a upper rank of the network equipment 100 and drive a hypervisor manager HM and a plurality of user programs UP1-UPn on the virtual machines VM0-VMn by mounting the hypervisor manager HM and the plurality of user programs on the virtual machines VM0-VMn. The user programs UP1-UPn perform the function of the network equipment 100. For example, if the network equipment 100 is equipment performing packet processing, at least one of the user programs UP1-UPn has a function of performing the creation and processing of a packet.

The network equipment 100 may include a processor 110, memory 120, and a network interface 130. The processor 110 may be implemented using a Central Processing Unit (CPU), other chipsets, a microprocessor, etc. The memory 120 may be implemented using a medium such as RAM, such as Dynamic Random Access Memory (DRAM), Rambus DRAM (RDRAM), Synchronous DRAM (SDRAM), Static RAM (SRAM). The network interface 130 allows the processor 110 or the memory 120 or both to access a network.

The hypervisor 200 functions to schedule the virtual machines VM0-VMn so that the virtual machines VM0-VMn can share one CPU core, manage the memory 120 so that the user programs UP1-UPn can access only respective memory spaces allocated thereto, and process a packet, inputted and outputted through a virtual network interface, through a physical network interface.

The virtual machines VM0-VMn are pieces of network equipment virtualized by the hypervisor 200. The virtual machines VM0-VMn may include a virtual processor, virtual memory, a virtual network interface and so on. The virtual machines VM0-VMn cannot access resources other than resources allocated thereto. This is because the hypervisor 200 supports isolation for resources.

The hypervisor manager HM is a management program driven on the virtual machine VM0, and it provides an interface capable of controlling the hypervisor 200. In the case where a monitor and a keyboard are attached, the hypervisor 200 may be controlled through keyboard input and monitor output. In the case where a keyboard and a monitor are not attached, the hypervisor 200 may be controlled through packet communication.

The user programs UP1-UPn are programs driven on the respective virtual machines VM1-VMn and are provided with independence between platforms. For example, if pieces of virtualized network equipment support the same kind of a high-level machine language, a user can drive a user program on a plurality of platforms through only one compilation without compiling the user program again. Furthermore, the user programs UP1-UPn can access virtual resources, allocated to the virtual machines VM0-VMn, through an Application Programming Interface (API) provided by the hypervisor 200.

Figure 2:
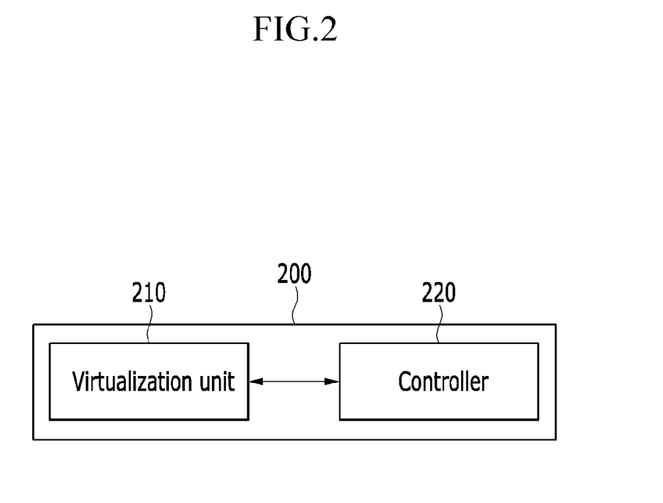
FIG. 2 is a diagram showing a hypervisor shown in FIG. 1.

FIG. 2 is a diagram showing the hypervisor shown in FIG. 1.

Referring to FIG. 2, the hypervisor 200 includes a virtualization unit 210 and a controller 220.

The virtualization unit 210 creates the virtual machines VM0-VMn by virtualizing the processor 110, the memory 120, and the network interface 130 of the network equipment 100, thus providing virtualized network equipment.

The controller 220 controls the virtualization unit 210 and configures a virtual network by controlling a connection between pieces of virtualized network equipments or between pieces of non-virtualized network equipment.

The virtualization unit 210 performs virtualization by providing pieces of virtual hardware, completely separated from each other, to the virtual machines VM0-VMn right over the network equipment 100 (that is, hardware). Accordingly, the virtual machines VM0-VMn can provide their services in fully separated virtualization environments without affecting each other.

Furthermore, since completely separated virtualization environments are provided, different user programs can be used in the virtual machines, and different policies or various network protocols can be provided.

Figure 3:
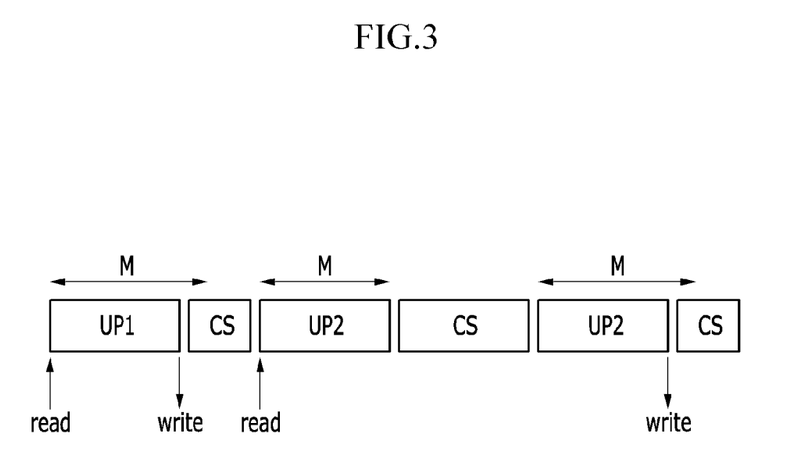
FIG. 3 is a diagram showing an example of the operation of a virtualized processor according to an embodiment of the present invention.

FIG. 3 is a diagram showing an example of the operation of a virtualized processor according to an embodiment of the present invention.

Referring to FIG. 3, the virtualization unit 210 performs process scheduling for the user programs UP1-UPn of the virtual machines VM0-VMn. The processor of the virtual machines VM0-VMn can execute one process and store a state of the executed process, instantly switch to another process, and execute the switched process.

If the plurality of user programs UP1-UPn is driven while sharing one processor, the virtualization unit 210 switches the user programs UP1-UPn at a certain time unit M and performs context switching when switching the user programs UP1-UPn. What the processor of the virtual machines VM0-VMn stores state information about a process, being executed at the moment when the process is switched, and recovers state information a process to which switching will be made is called context switching. Here, with a decrease in the amount of state information to be stored, the cost of context switching is reduced in proportion to the decrease.

For example, if packet processing of the user program UP1 is finished within the time unit M, context switching may be performed at low cost. If packet processing of the user program UP2 is not finished within the time unit M, expensive context switching may be performed.

In the case of network equipment chiefly performing packet processing, a transaction unit tend to be a packet unit. For example, in the case of UDP packet processing, network equipment modifies the UDP packet whenever the UDP packet is received and sends the modified packet. After such packet processing, it is not necessary to store state information. On the other hand, in the case of a TCP packet, there is state information that must be maintained even after one packet is processed, but likewise state information to be stored after packet processing is more reduced than state information to be stored during packet processing. That is, in the case of network equipment, there is a point of time at which context switching can be performed for each packet unit at low cost. Accordingly, the virtualization unit 210 sets the time unit for context switching to a packet unit using the packet unit so that cheap context switching can be performed.

Figure 4:
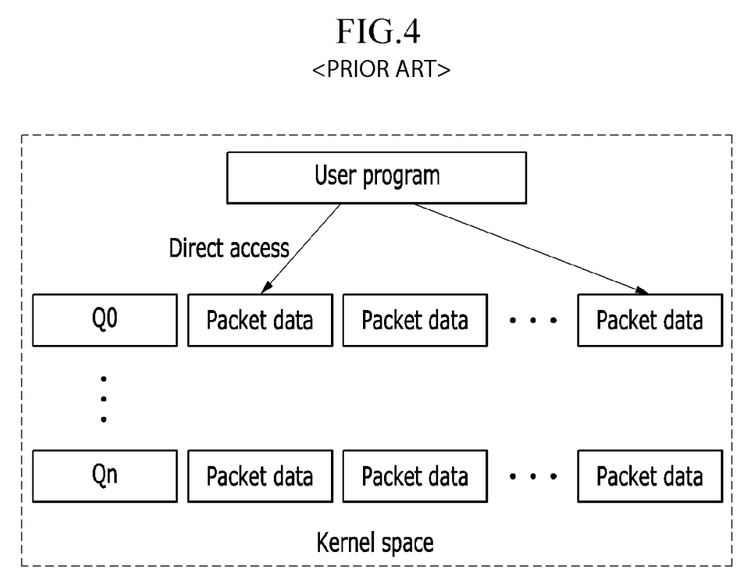
FIG. 4 is a diagram showing a packet processing model of Octeon.

FIG. 4 is a diagram showing a packet processing model of Octeon.

Referring to FIG. 4, an Octeon network processor manages packet queues Q0-Qn on memory for high-speed packet processing. A method of copying packet data from a network interface whenever the packet data is inputted and outputted is inefficient. Accordingly, when the packet data is inputted and outputted, the network interface directly stores the packet data in memory (that is, Kernel space) accessible to a processor (that is, a CPU) in order to reduce the input and output time of the packet data.

In this Octeon network processor, since only one user program is driven in one CPU, the user program can access the entire space of the memory and access packet data stored by the Octeon network processor.

Unlike in the Octeon network processor, if several user programs are driven in one CPU as shown in FIG. 1, there is a need for a method of protecting a packet for each user program.

Figure 5:
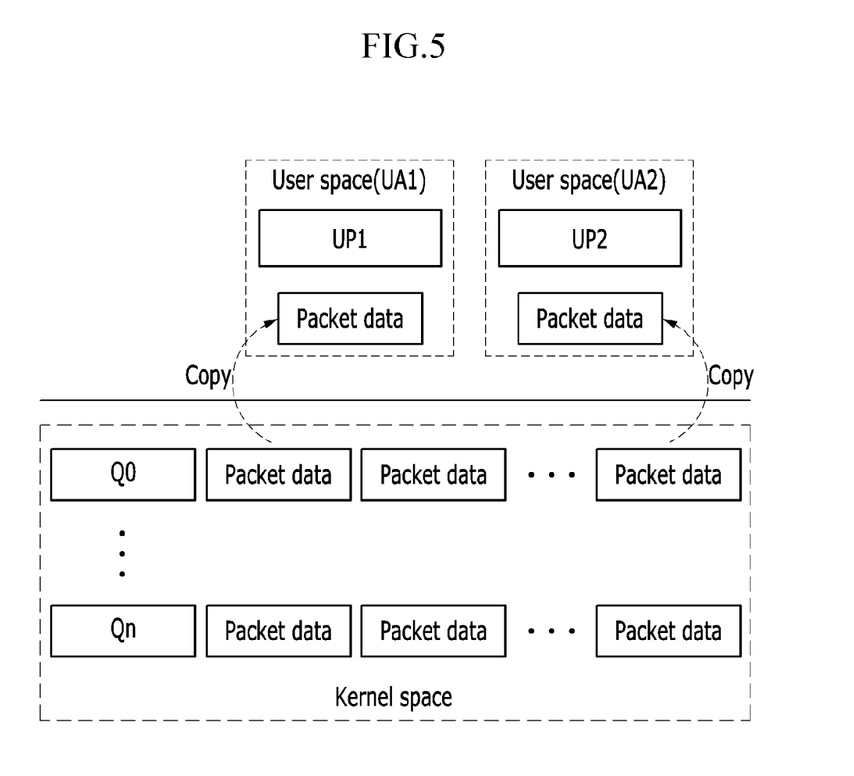
FIGS. 5 and 6 are diagrams showing respective examples of memory virtualization methods according to embodiments of the present invention.
Figure 6:
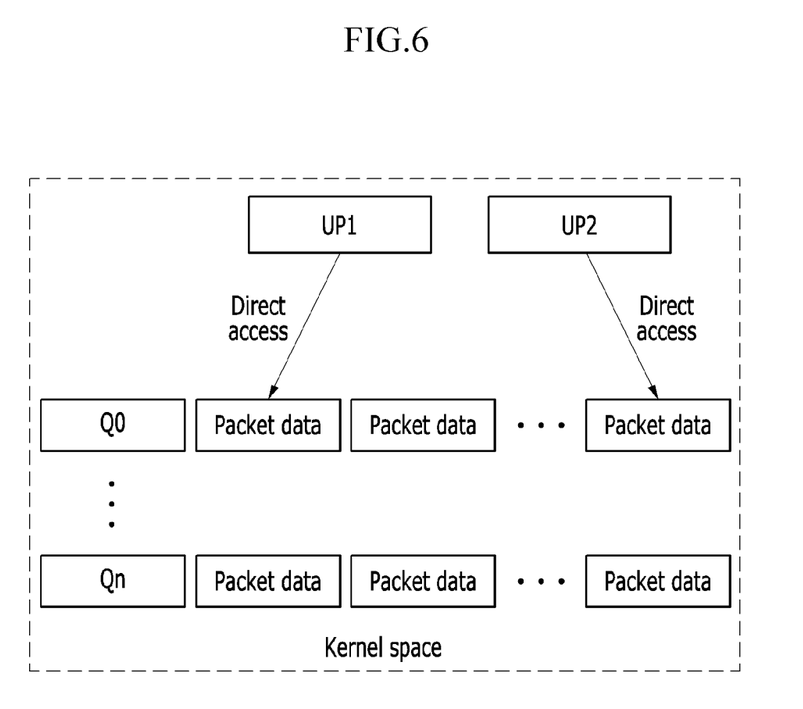

FIGS. 5 and 6 are diagrams showing respective examples of memory virtualization methods according to embodiments of the present invention.

FIG. 5 is a method used in a common operating system. The virtualization unit 210 creates virtual memory by virtualizing the memory 120. The virtualization unit 210 may divide the space of the virtual memory into a memory space (that is, Kernel space) in which packet data is stored and a user space used by user programs UP1 and UP2. Furthermore, the user space may be divided into a space for the user program UP1 and a space for the user program UP2. Here, in the user space, the copy of packet data is indispensable. If packet data of 1500 octets in size is copied, 9.26 μs is consumed in an Octeon 5860 network processor operating at 750 MHz. If the same packet data is simply forwarded, 4.3 μs is consumed. Accordingly, one memory copy reduces efficiency of packet processing by about 315%.

Particularly, if the user programs UP1 and UP2 are written using a language, such as C or an assembler, it is indispensable to divide a space into spaces for the user programs UP1 and UP2 and protect the divided spaces because a user can access various spaces of hardware using a pointer. However, if the user programs UP1 and UP2 are written using a language not using a pointer, such as Java or C#, the user programs UP1 and UP2 can access only memory allocated thereto. Accordingly, as shown in FIG. 6, the user programs UP1 and UP2 written using a language not using a pointer cannot fundamentally access memory other than spaces allocated thereto because there is no pointer. Accordingly, the virtualization unit 210 does not need to divide and protect memory space.

A characteristic of a language not using a pointer is that it provides a high-level machine language. The high-level machine language, also called a byte code or an intermediate code, is typically platform-independent. Accordingly, the user programs UP1-UPn have independence between platforms in the binary level.

As described above, the user programs UP1-UPn are platform-independent. Accordingly, if the same kind of high-level machine languages are supported in a Personal Computer (PC) (that is, one of pieces of terminal network equipment), the user programs can also be deployed in the PC. Accordingly, a user can compile a user program using a development tool, load the compiled program onto a hypervisor being driven on a PC, and execute the loaded program. It is not easy to perform high-speed packet processing on a PC using a user program because it is difficult for the PC to perform high-speed packet processing, unlike a network processor. However, the high-speed packet processing can be performed by performing debugging and a test for checking whether the user program is properly operated on the PC and then loading the complied user program onto a network processor without conversion.

A hypervisor deployed on a PC may also be used as a terminal network apparatus. A PC can basically send only standardized packets, such as TCP/IP and UDP/IP. If the hypervisor according to the embodiment of the present invention is used, however, a user can easily send a desired form of a packet through the user's PC.

Furthermore, a user can also distribute user programs to the hypervisor deployed on a network processor using a distribution tool. A user can configure a virtual network, performing packet processing at high speed, by operating a user program on a network processor. For example, in the case where different users install the user programs UP1 and UP2 in respective pieces of network equipments, the users share physical network resources, but can configure respective virtual networks logically separated from each other.

In general, in order to configure a virtual network, all pieces of network equipment constituting a network must have been virtualized. For example, in the case where B network equipment has not been virtualized in a network in which A network equipment and the B network equipment are connected together and the B network equipment and C network equipment are connected together, the A network equipment and the C network equipment cannot communicate with each other. As a representative case, there is a case where a non-standard packet is created and sent within a virtual network. A virtual network cannot be configured between the pieces of A, B, and C network equipment because a user program capable of processing a non-standard packet is deployed in the A network equipment and the C network equipment, but the B network equipment cannot process the non-standard packet.

Figure 7:
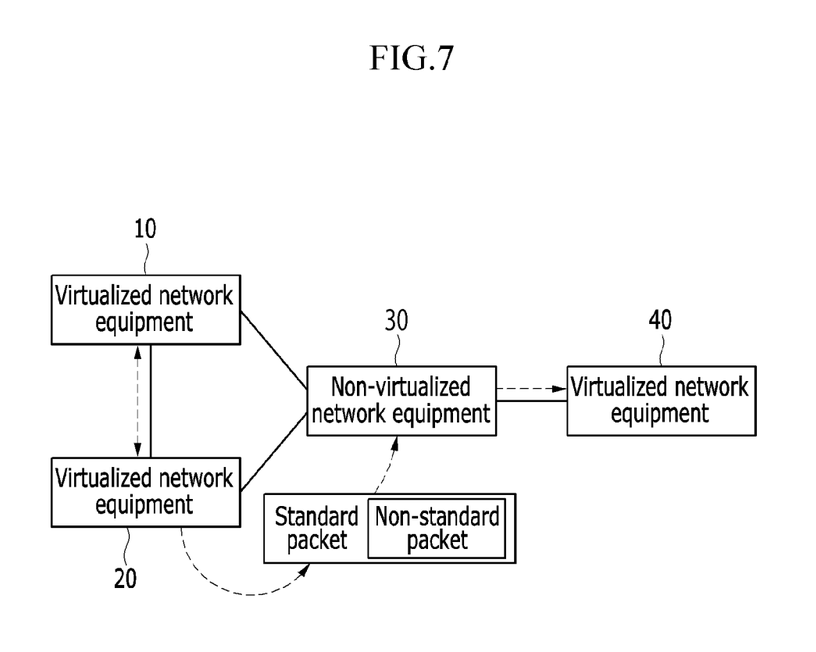
FIG. 7 is a diagram showing an example of a method of configuring a virtual network according to an embodiment of the present invention.

FIG. 7 is a diagram showing an example of a method of configuring a virtual network according to an embodiment of the present invention.

Referring to FIG. 7, if it is sought to mount user programs on two pieces of neighbor virtualized network equipment 10 and 20 and to send packets having a different form from a standard form, there is no problem in exchanging the packets because only Ethernet communication is performed between the two pieces of virtual network equipment 10 and 20. However, if network equipment 30 capable of sending only a non-virtualized and standardized packet is placed between the two pieces of virtual network equipment 10 and 20, the non-standard packet cannot be directly transmitted. In this case, the controller 220 uses a method of encapsulating the non-standard packet in a standard packet and sending the non-standard packet by using a tunnel.

That is, in the case where a non-standard packet is sent to the neighbor virtualized network equipment 10, the controller 220 of the virtualized network equipment 20 sends the non-standard packet without change. In the case where communication is performed with the network equipment 30 or with remote virtualized network equipment 40 with the network equipment 30 interposed therebetween, the controller 220 of the virtualized network equipment 20 encapsulates a user's non-standard packet in a standard packet, such as an Internet Protocol (IP), and sends the standard packet.

On the other hand, if an encapsulated packet is received, the controller 220 of the virtualized network equipment 20 decapsulates the encapsulated packet and transfers only a non-standard packet part within a standard packet to a relevant user program. In this case, communication between neighbor and remote programs can be performed without modifying the user programs.

At least some function of the hypervisor described above according to the embodiment of the present invention may be implemented in hardware or in software combined with hardware. An embodiment in which the hypervisor is combined with network equipment is described in detail below with reference to FIG. 8.

Figure 8:
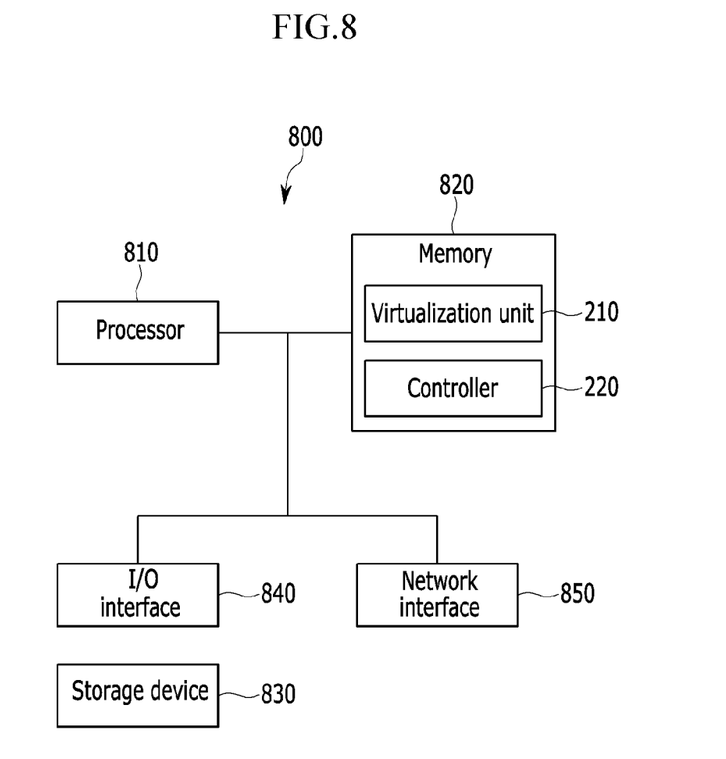
FIG. 8 is a schematic diagram of a virtualization apparatus of network equipment according to another embodiment of the present invention.

FIG. 8 is a schematic diagram of a virtualization apparatus of network equipment according to another embodiment of the present invention. FIG. 8 shows a system which may be used to perform at least some of the functions of the virtualization unit 210 and the controller 220 described with reference to FIGS. 2 to 7. Furthermore, the system may be the network equipment 100 of FIG. 1.

Referring to FIG. 8, the virtualization apparatus includes a processor 810, memory 820, a storage device 830, an input/output (I/O) interface 840, and a network interface 850.

The processor 810 may be implemented using a CPU, other chipsets, a microprocessor or the like. The memory 820 may be implemented using a medium such as RAM, such as DRAM, RDRAM, SDRAM, or SRAM. The storage device 830 may be implemented using an optical disk, such as a hard disk, CD-ROM (compact disk read only memory), CD-RW (CD rewritable), DVD-ROM (digital video disk ROM), DVD-RAM, DVD-RW disk, and a blu-ray disk, flash memory, or various forms of permanent or volatile memory, such as RAM. Furthermore, the I/O interface 840 enables the processor 810 or the memory 820 or both to access the storage device 830. The network interface 850 enables the processor 810 or the memory 820 or both to access a network.

In this case, the processor 810 may load program codes for implementing at least some of the functions of the virtualization unit 210 and the controller 220 onto the memory 820 and control the program command so that the operations described with reference to FIGS. 1 to 7 can be performed. Furthermore, the program codes may be stored in the storage device 830 or may be stored in another system connected to the virtualization apparatus over a network.

According to an embodiment of the present invention, the cost of context switching can be reduced using a characteristic of network equipment chiefly performing packet processing, and a virtual network between pieces of network equipment at remote places can be configured.

Furthermore, according to an embodiment of the present invention, packet processing efficiency can be improved because a process of dividing a memory space for each user program and copying packet data to the regions can be omitted by virtualizing network equipment using a platform-independent high-level machine language. Furthermore, in the case where a plurality of user programs is shared by dividing one core, information necessary for context switching can be reduced because hardware for protecting memory needs not to be used. Furthermore, in the case where the same high-level machine language is processed in virtualized network equipment, a user program can be deployed in various platforms and can be distributed in a compile form. Accordingly, major pieces of information, such as the source codes of a user program, can be protected. Furthermore, since a user program can be deployed in network equipment directly accessible to a user, such as a personal computer, development and test are easy. Furthermore, since a user program can be driven even in terminal network equipment, such as a personal computer, a packet of a form desired by a user can be created and transmitted by a terminal.

The embodiments of the present invention are not implemented only through the above-described methods and apparatuses, but may be implemented through a program for realizing a function corresponding to the construction according to the embodiment of the present invention or a recording medium on which the program is recorded. The implementations will be evident to those having ordinary skill in the art to which the present invention pertains from the above-described embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A virtualization apparatus, comprising:
network equipment including a processor, memory, and a network interface, and
a network virtualization management module providing at least one virtualized network equipment by virtualizing the network equipment,
wherein, if a non-virtualized network equipment is coupled between the virtualized network equipment and a packet destination and the packet to be sent is a non-standard packet, the virtualization apparatus encapsulates the non-standard packet in a standard packet and sends the encapsulated packet to the non-virtualized network equipment,
wherein, if the virtualized network equipment is directly coupled to a second virtualized network equipment, the virtualization apparatus sends the non-standard packet to the second virtualized network equipment without performing encapsulation,
wherein the non-standard packet is a packet that does not conform to the UDP or TCP standards,
wherein the network virtualization management module determines whether first and second user programs running on the virtualized network equipment are written in a language that uses memory address pointers,
wherein when the first and second user programs are determined to be written in a language that uses memory address pointers, the network virtualization management module divides virtual memory into a kernel space including a plurality of packet data, a first user space including the first user program, and a second user space including the second program and copies packet data used by the first and second user programs from the kernel space to the first and second user spaces, respectively, and
wherein when the first and second user programs are determined to be written in a language that does not use memory address pointers, the network virtualization management module executes the first and second user programs in kernel space.

2. The virtualization apparatus of claim 1, wherein the network virtualization management module performs context switching at a predetermined time interval corresponding to a time for finishing packet processing.

3. The virtualization apparatus of claim 1, wherein the network equipment comprises a router performing packet processing.

4. A method of virtualizing network equipment, comprising the steps of:
> providing at least one virtualized network equipment by virtualizing the network equipment;
> scheduling the at least one virtualized network equipment;
> executing a program of the at least one virtualized network equipment according to the scheduling;
> performing context switching at a predetermined time interval corresponding to a time for finishing packet processing;
> determining whether first and second user programs running on the virtualized network equipment are written in a language that uses memory address pointers;
> when the first and second user programs are determined to be written in a language that uses memory address pointers,
>> dividing virtual memory into a kernel space including a plurality of packet data, a first user space including the first user program, and a second user space including the second program, and
>> copying packet data used by the first and second user programs from the kernel space to the first and second user spaces, respectively; and
> when the first and second user programs are determined to be written in a language that does not use memory address pointers,
>> executing the first and second user programs in kernel space.

5. The virtualization method of claim 4, wherein the program executes packet processing.

6. The virtualization method of claim 4, wherein: the program executes packet processing, and the virtualization method further comprises encapsulating and sending the processed packet.

7. The virtualization method of claim 6, further comprising:
> if the non-virtualized network equipment is coupled between the virtualized network equipment and the destination of the non-standard packet, encapsulating the non-standard packet in a standard packet; and
> sending the encapsulated packet to the non-virtualized network equipment,
> wherein the destination of the packet is the virtualized network equipment or a second virtualized network equipment, and the non-standard packet is a packet that does not conform to the UDP or TCP standards.

8. The virtualization method of claim 6, further comprising a step of decapsulating a received encapsulated packet and transferring the decapsulated packet to the program.

* * * * *